(12) United States Patent
Meng et al.

(10) Patent No.: US 12,405,973 B2
(45) Date of Patent: Sep. 2, 2025

(54) MAP DATA UPDATING METHOD, APPARATUS AND ELECTRONIC DEVICE

(71) Applicant: Beijing Baidu Netcom Science Technology Co., Ltd., Beijing (CN)

(72) Inventors: Zhangwei Meng, Beijing (CN); Shixi Dong, Beijing (CN); Chaoyu Shi, Beijing (CN); Bingqiao Ma, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/923,202

(22) PCT Filed: Nov. 30, 2021

(86) PCT No.: PCT/CN2021/134367
§ 371 (c)(1),
(2) Date: Nov. 3, 2022

(87) PCT Pub. No.: WO2022/267346
PCT Pub. Date: Dec. 29, 2022

(65) Prior Publication Data
US 2024/0248916 A1    Jul. 25, 2024

(30) Foreign Application Priority Data
Jun. 22, 2021    (CN) .......................... 202110691680.6

(51) Int. Cl.
G06F 16/29    (2019.01)
G06F 16/23    (2019.01)

(52) U.S. Cl.
CPC .......... *G06F 16/29* (2019.01); *G06F 16/2365* (2019.01); *G06F 16/2379* (2019.01)

(58) Field of Classification Search
None
See application file for complete search history.

(56) References Cited

U.S. PATENT DOCUMENTS 10,094,672 B2 * 10/2018 Utsugi .................... H04L 69/22
2005/0114016 A1    5/2005 Kim et al.
(Continued)

FOREIGN PATENT DOCUMENTS

CN    101162149 A    4/2008
CN    105302914 A    12/2011
(Continued)

OTHER PUBLICATIONS

Bastani, Favyen, et al. "Machine-assisted map editing." Proceedings of the 26th ACM SIGSPATIAL International Conference on Advances in Geographic Information Systems. 2018. (Year: 2018).*
(Continued)

*Primary Examiner* — Uyen T Le
(74) *Attorney, Agent, or Firm* — Maginot, Moore & Beck LLP (57) ABSTRACT

This disclosure provides a map data updating method, a map data updating apparatus and an electronic device, and relates to the field of map technology. The method includes: obtaining update information of first map data, and a mapsheet in the first map data that corresponds to the update information; performing, based on a spatial update range of the update information, clipping processing on target data of the mapsheet to obtain first target mapsheet data, the first target mapsheet data including data in the target data that is within the spatial update range; updating, based on the first target mapsheet data and the update information, the first map data.

9 Claims, 4 Drawing Sheets

(56) References Cited

U.S. PATENT DOCUMENTS

| | | | | |
|---|---|---|---|---|
| 2011/0113116 | A1* | 5/2011 | Burdette | H04L 67/55 707/769 |
| 2018/0181576 | A1* | 6/2018 | Hansen | G06F 16/444 |
| 2019/0094029 | A1* | 3/2019 | Okada | H04W 12/33 |
| 2019/0347249 | A1* | 11/2019 | Sekiguchi | G06F 16/23 |
| 2020/0226119 | A1* | 7/2020 | Naruse | G06T 7/55 |
| 2020/0311836 | A1* | 10/2020 | Chen | G06Q 50/06 |
| 2021/0123762 | A1 | 4/2021 | Cajias et al. | |
| 2021/0140782 | A1* | 5/2021 | Ootsuji | G06V 20/56 |

FOREIGN PATENT DOCUMENTS

| | | | | |
|---|---|---|---|---|
| CN | 102298873 | A | 2/2016 | |
| CN | 106250387 | A | 12/2016 | |
| CN | 107273486 | A | 10/2017 | |
| CN | 109189304 | A | 1/2019 | |
| CN | 110765223 | A | 2/2020 | |
| CN | 111375206 | A | 7/2020 | |
| CN | 111630348 | A | 9/2020 | |
| CN | 112131332 | A | 12/2020 | |
| CN | 112783911 | A | 5/2021 | |
| CN | 113360589 | A | 9/2021 | |
| EP | 2626668 | A1 | 8/2013 | |
| EP | 3247978 | B1 * | 3/2021 | G01C 21/32 |
| JP | H08329215 | A | 12/1996 | |
| JP | 2002056399 | A | 2/2002 | |
| JP | 2003050543 | A | 2/2003 | |
| JP | 2007010598 | A * | 1/2007 | |
| JP | 2007078366 | A * | 3/2007 | |
| WO | WO-2008044547 | A1 * | 4/2008 | G01C 21/32 |

OTHER PUBLICATIONS

Degbelo, Auriol, and Sulaxan Somaskantharajan. "Speech-based interaction for map editing on mobile devices: a scenario-based study." Proceedings of Mensch und Computer 2020. 2020. 343-347. (Year: 2020).*

Vargas-Munoz JE, Srivastava S, Tuia D, Falcao AX. OpenStreetMap: Challenges and opportunities in machine learning and remote sensing. IEEE Geoscience and Remote Sensing Magazine. Jun. 17, 2020;9(1):184-99. (Year: 2020).*

Extended European Search Report corresponding to European Patent Application No. 21938138.1, dated Jan. 9, 2024. (9 pages).

Japanese Office Action corresponding to Japanese Patent Application 2023-514970, dated Jan. 15, 2024. (3 Pages).

English Translation of Japanese Office Action corresponding to Japanese Patent Application 2023-514970, dated Jan. 15, 2024. (3 Pages).

English Machine Translation of JPH08329215A. (20 Pages).

English Machine Translation of JP2003050543A. (16 Pages).

English Machine Translation of JP2002056399A. (14 Pages).

English Translation of CN112131332A. (21 Pages).

English Machine Translation of CN111630348A. (16 Pages).

English Translation of International Search Report corresponding to International Patent Application No. PCT/CN2021/134367, dated Mar. 17, 2022. (4 pages).

International Search Report corresponding to International Patent Application No. PCT/CN2021/134367, dated Mar. 17, 2022. (9 pages).

Chinese Office Action corresponding to Chinese Patent Application 202110691680.6, dated Apr. 15, 2023. (8 Pages).

Machine English Translation Chinese Office Action corresponding to Chinese Patent Application 202110691680.6, dated Apr. 15, 2023. (3 Pages).

English Machine Translation of CN101162149A. (16 Pages).

English Machine Translation of CN106250387A. (21 Pages).

English Machine Translation of CN111375206A. (33 Pages).

English Machine Translation of CN112783911A. (19 Pages).

English Machine Translation of CN113360589A. (28 Pages).

English Machine Translation of CN110765223A. (22 Pages).

English Machine Translation of CN109189304A. (13 Pages).

English Machine Translation of CN107273486A. (19 Pages).

English Machine Translation of CN102298873A. (15 Pages).

English Machine Translation of CN105302914A. (17 Pages).

* cited by examiner

MAP DATA UPDATING METHOD, APPARATUS AND ELECTRONIC DEVICE

CROSS-REFERENCE TO RELATED APPLICATION

The present application is a U.S. national phase application of a PCT Application No. PCT/CN2021/134367 filed on Nov. 30, 2021, which claims a priority to the Chinese patent application No. 202110691680.6 filed in China on Jun. 22, 2021, disclosures of which are incorporated herein by reference in their entireties.

TECHNICAL FIELD

The present disclosure relates to the field of data processing technology, especially to the field of map technology, and in particular to a map data updating method, a map data updating apparatus and an electronic device.

BACKGROUND

In the traditional map data production industry, a mapsheet is the smallest data unit for storage and circulation. The mapsheet usually refers to a data tile of 10 KM*10 KM in size, and mapsheets can be spliced into the national or even global map data.

Conventionally, in response to real-world updates and changes, map data is usually modified accordingly on the basis of a operation task package. The operation task package includes several pieces of update material (the update material may include update information) and several mapsheets.

Specifically, a process of generating a operation task package usually includes: selecting operation material for aggregation according to conditions such as priority and spatial relationship, selecting the mapsheet that spatially intersects with the operation material and adding it to a mapsheet set, and updating map data based on the mapsheet data in the mapsheet set and the operation material.

SUMMARY

According to a first aspect of the present disclosure, a map data updating method is provided, including:
  obtaining update information of first map data, and a mapsheet in the first map data that corresponds to the update information;
  performing, based on a spatial update range of the update information, clipping processing on target data of the mapsheet to obtain first target mapsheet data, the first target mapsheet data including data in the target data that is within the spatial update range;
  updating, based on the first target mapsheet data and the update information, the first map data.

According to a second aspect of the present disclosure, an electronic device is provided, including:
  at least one processor; and
  a memory communicatively connected to the at least one processor; wherein,
  the memory stores therein an instruction configured to be executed by the at least one processor, and the at least one processor is configured to execute the instruction, to implement the method according to the first aspect.

According to a third aspect of the present disclosure, a non-transitory computer readable storage medium storing therein a computer instruction is provided, wherein the computer instruction is configured to be executed by a computer, to implement the method according to the first aspect.

It is understood, this summary is not intended to identify key features or essential features of the embodiments of the present disclosure, nor is it intended to be used to limit the range of the present disclosure. Other features of the present disclosure will become more comprehensible with reference to the following description.

BRIEF DESCRIPTION OF THE DRAWINGS

The drawings are used for better understanding of the present solution, and do not constitute a limitation on the present disclosure.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the range and spirit of the present disclosure. Further, for clarity and conciseness, descriptions of known functions and structures are omitted.

First Embodiment

Figure 1:
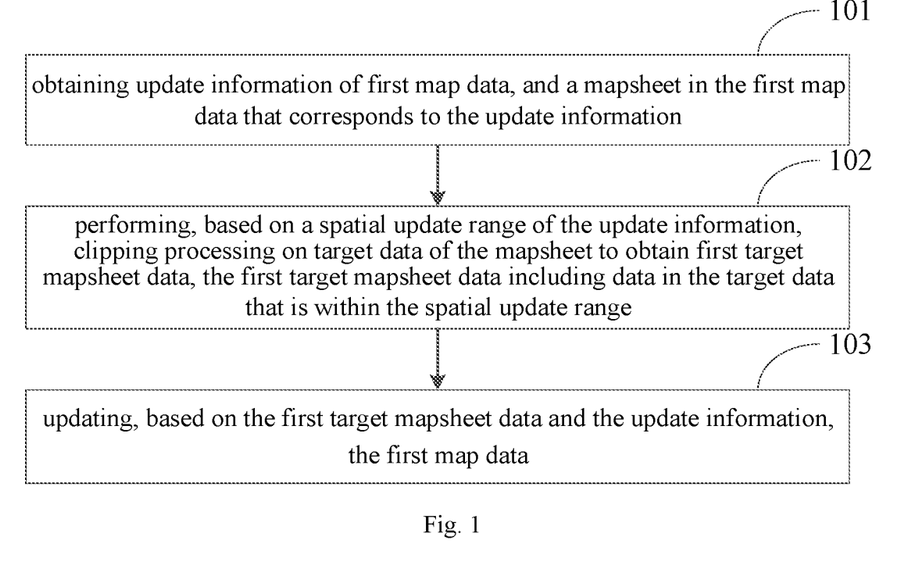
FIG. 1 is a schematic flowchart of a map data updating method according to a first embodiment of the present disclosure.

As shown in FIG. 1, the present disclosure provides a map data updating method, including the following steps S101-S103.

Step S101: obtaining update information of first map data, and a mapsheet in the first map data that corresponds to the update information.

In this embodiment, the map data updating method relates to data processing technology, in particular to the field of map technology, and can be widely used in map data updating scenarios. The method may be performed by a map data updating apparatus provided in embodiments of the present disclosure. The map data updating apparatus may be provided in any electronic device to perform the map data updating method in the embodiment of the present disclosure. The electronic device may be a server or a terminal, which is not specifically limited here.

The first map data may be data before the map is updated, the map may be formed by splicing a plurality of mapsheets, and the data resulting from the splicing may be referred to as the first map data.

The first map data may be global map data, map data of a certain country, map data of an administrative area, or map data of other areas, which is not specifically limited here.

The update information may represent an update change in the real world, and may include at least one piece of operation material, wherein the operation material may refer to driving information in the map data updating process, and one piece of operation material represents an update change in the real world. For example, one piece of operation material may include information about the addition of one electronic eye in area A. Correspondingly, the map data updating apparatus may be driven to update the map data based on the operation material.

There may be various ways to obtain the update information of the first map data, such as, obtaining the operation material uploaded by the user to generate the update information of the first map data, or downloading the operation material from the network to generate the update information of the first map data, or obtaining pre-stored operation material to generate the update information of the first map data, or receiving operation material sent by other electronic devices to generate the update information of the first map data.

The operation material of the update information may include a location in the map that needs to be updated spatially, such as, the information related to a newly added electronic eye in a certain location in area A. Correspondingly, according to the spatial relationship between the operation material and the map, a mapsheet in the map that intersects spatially with the operation material of the update information can be obtained from mapsheets corresponding to the first map data, so as to obtain a mapsheet in the first map data that corresponds to the update information.

A quantity of mapsheets corresponding to the update information is determined according to a spatial update range of the operation material of the update information, and the mapsheet quantity may be one or more than one, which is not specifically limited here. For example, if the spatial update range of the operation material of the update information only involves data of one mapsheet, the mapsheet quantity corresponding to the update information is one, and if the spatial update range of the operation material of the update information involves data of multiple mapsheets, the mapsheet quantity corresponding to the update information is more than one.

In practice, before the map data updating operation, the operation material of the first map data can be collected to prepare the update information of the first map data, and the mapsheet in the first map data that corresponds to the update information can be obtained accordingly, so as to generate operation task packages based on these pieces of information.

Step S102: performing, based on a spatial update range of the update information, clipping processing on target data of the mapsheet to obtain first target mapsheet data, the first target mapsheet data including data in the target data that is within the spatial update range.

In this step, the spatial update range refers to the spatial influence range of the operation material of the update information on the map, and the spatial influence range refers to the actual editing range when the map data is updated, and the spatial update range may be larger than or equal to the spatial range of the mapsheet corresponding to the update information. That is to say, when the map data is updated, it may not involve all the data within the spatial range of the mapsheet corresponding to the update information, and may only involve the data within the actual editing range in the mapsheet corresponding to the update information.

For example, the data within the spatial range of the mapsheet corresponding to the update information may include map data of area A and area B, and the operation material of the update information only indicates that the map data of area A needs to be updated, then the spatial update range corresponding to the update information is area A.

In this way, the target data of the mapsheet can be clipped based on the spatial update range of the update information to obtain the first target mapsheet data. The target data may refer to all data within the spatial range of the mapsheet.

There may be various ways of clipping the target data of the mapsheet based on the spatial update range of the update information, for example, the mapsheet may be clipped according to the spatial update range of the update information, such as, a part of the mapsheet that includes the area A may be clipped, and the data within the spatial range of the clipped part is the first target mapsheet data.

For another example, some data in the target data of the mapsheet can be erased according to the spatial update range of the update information, for example, the data within the spatial update range in the mapsheet can be retained, while other data in the mapsheet can be deleted, and the resultant first target mapsheet data includes data in the target data that is within the spatial update range.

The target data can be clipped according to the characteristics of the operation material, for example, the operation material involving the update content characterized by a point, such as electronic eye material, can be clipped according to a point radiation space, and the operation material involving the update content characterized by a road link, such as road material, can be clipped according to a road link space.

Figure 2:
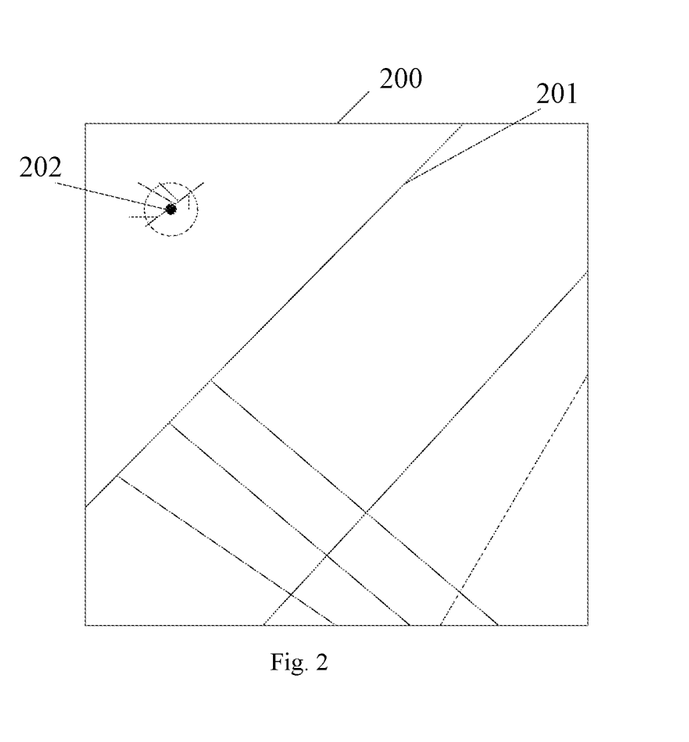
FIG. 2 is a data display diagram of a mapsheet.
Figure 3:
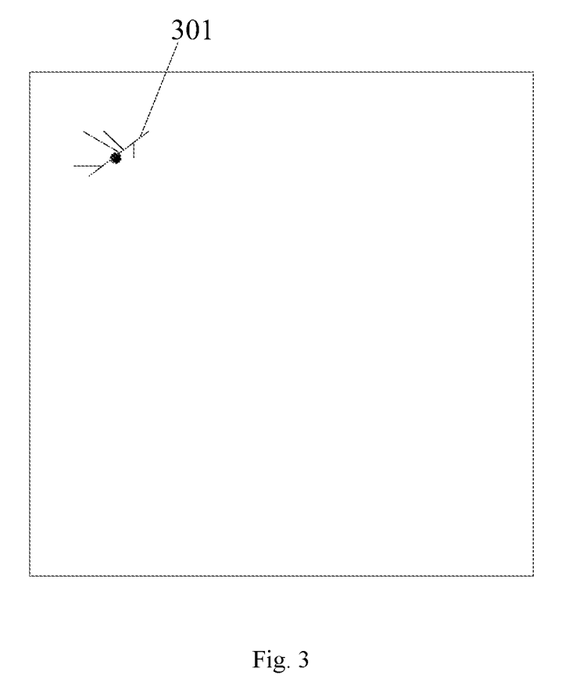
FIG. 3 is a data display diagram of the mapsheet after being clipped.

As shown in FIG. 2, which is a schematic diagram of one mapsheet, the line 201 in the mapsheet 200 represents data in the mapsheet, the operation material corresponding to the mapsheet involves the electronic eye material 202, and clipping processing centered at the update location of the electronic eye and having a radius of a preset distance such as 500 meters may be performed on the target data, to obtain the clipped mapsheet data. As shown in FIG. 3, the data 301 in the middle and having a tree fork shape is the retained data, that is, the first target mapsheet data.

Figure 4:
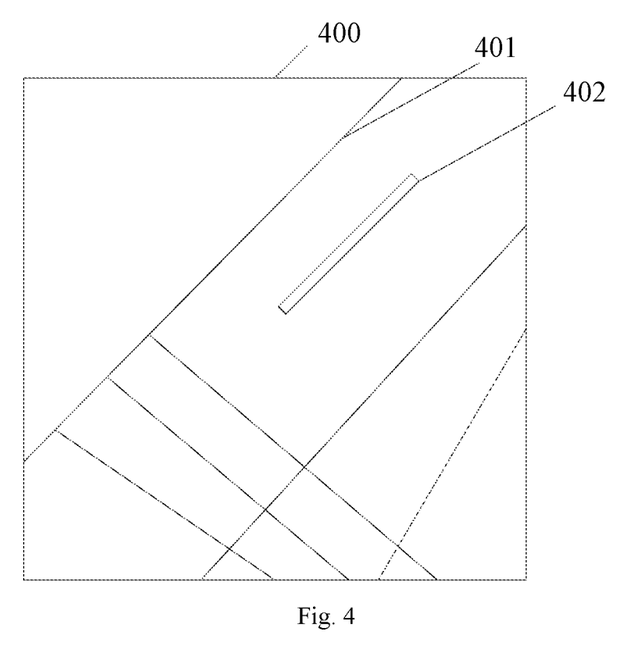
FIG. 4 is a data display diagram of another mapsheet.
Figure 5:
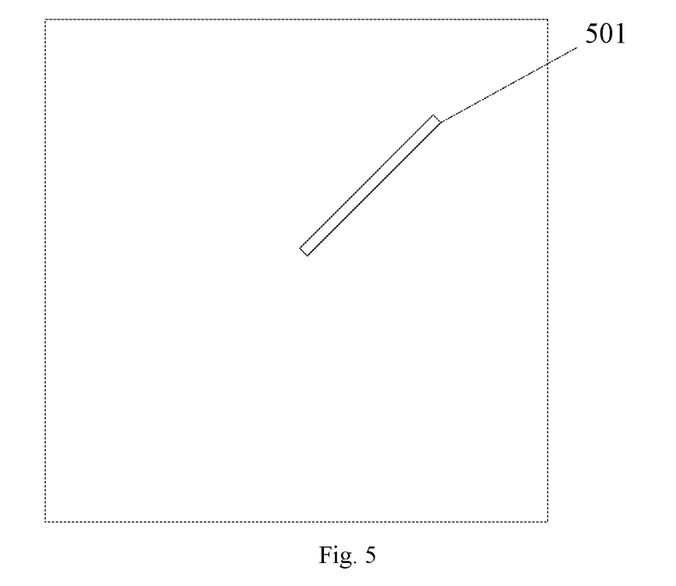
FIG. 5 is a data display diagram of the another mapsheet after being clipped.

As shown in FIG. 4, which is a schematic diagram of another mapsheet, the line 401 in the mapsheet 400 represents the data in the mapsheet, the operation material corresponding to the mapsheet involves the lane quantity material 402, and clipping processing, using the road to which the lane quantity material is bound as a baseline, the left and right margins of the road link being 100 meters, and tracing forward and backward for 1000 meters (a total of 2000 meters) along the road link, is performed on the target date, to obtain the clipped mapsheet data. As shown in FIG. 5, the road link 501 is the retained data, that is, the first target mapsheet data.

In practice, before the map data updating operation, the target data of the mapsheet may be clipped based on the spatial update range of the update information to obtain the first target mapsheet data, and an operation task package is aggregated and generated based specifically on the update information and the first target mapsheet data, wherein the operation task package is used to carry out the map data updating operation.

Step S103: updating, based on the first target mapsheet data and the update information, the first map data.

In this step, the first target mapsheet data may be edited based on the operation material of the update information to obtain updated mapsheet data, and then the updated mapsheet data may be merged with the target data, to update the first map data.

The first target mapsheet data may be edited based on the update location, update type, update content and the like indicated in the operation material corresponding to the update information, to obtain updated mapsheet data. The update type may include delete, add and modify, etc., and the update content indicates how the real world has changed.

For example, the update location is location A in area A, the update type is add, and the update content is electronic eye, that is, the operation material indicates that a electronic eye is newly added at location A in area A, and correspondingly, the location corresponding to the location A in the clipped mapsheet is edited, to add the data of one electronic eye to the clipped mapsheet, that is, adding the map data representing electronic eye information to the first target mapsheet data to obtain the updated mapsheet data.

For another example, the update location is location B in area A, the update type is delete, and the update content is electronic eye, that is, the operation material indicates that an electronic eye is deleted at location B in area A, and correspondingly, the location corresponding to the location B in the clipped mapsheet is edited, to delete the data of one electronic eye from the clipped mapsheet, that is, deleting the map data representing electronic eye information from the first target mapsheet data to obtain the updated mapsheet data.

For another example, the update location is location C in area A, the update type is modify, and the update content is to increase the quantity of road lanes, that is, the operation material indicates that the quantity of road lanes is modified at location C in area A. Accordingly, the location corresponding to location C in the clipped mapsheet is edited to modify the data of the quantity of road lanes in the clipped mapsheet so that the quantity of road lanes is increased, that is, the map data representing the quantity of road lanes is modified in the first target mapsheet data to obtain the updated mapsheet data.

In addition, before performing the edit processing, the editable range corresponding to the first target mapsheet data may be marked, or the editable range corresponding to the first target mapsheet data may not be marked, which is not specifically limited here.

Correspondingly, when the quantity of pieces of operation material of the update information is greater than 1, the first target mapsheet data may be edited based on all the operation material of the update information to obtain updated mapsheet data, and then the updated mapsheet data and the target data can be merged to obtain the second map data, which is the map data updated from the first map data, and the second map data includes the merged mapsheet data and data of other mapsheets in the first map data than the mapsheet corresponding to the update information.

It is also possible to perform edit processing on the first target mapsheet data based on a part of the operation material of the update information, to obtain updated mapsheet data, and then merge the updated mapsheet data with the target data, and perform edit processing on the merged mapsheet data based on other operation materials to finally obtain the second map data.

In practice, during the map data updating operation for the aggregated operation task package, the first map data may be updated based on the first target mapsheet data in the operation task package and the update information.

In the embodiment, the method includes: obtaining update information of first map data, and a mapsheet in the first map data that corresponds to the update information; performing, based on a spatial update range of the update information, clipping processing on target data of the mapsheet to obtain first target mapsheet data, the first target mapsheet data including data in the target data that is within the spatial update range; updating, based on the first target mapsheet data and the update information, the first map data. Since the target data of the mapsheet is clipped, the data volume of the mapsheet set aggregated in the operation task package can be reduced, thus the data volume of the operation task package can be reduced, and the operation effect of the map data updating process can be improved, for example, the circulation speed of operation task packages is fastened, the occupied bandwidth is reduced, the loading time of map data updating operation is reduced, and the data processing rate is improved.

In addition, since the operation task package is aggregated, the quantity of pieces of operation material in the operation task package can fall within the economic range, which can reduce the time cost and continuous cost of frequent manual switching of tasks. The data volume corresponding to one piece of operation material can be reduced, making the data volume controllable, which can greatly reduce the cost of circulation and the cost of loading.

Optionally, the update information includes M to-be-updated elements, M being a positive integer, and the step S103 specifically includes:

performing, based on the M to-be-updated elements, edit processing on the first target mapsheet data to obtain the second target mapsheet data;

merging the second target mapsheet data and the target data, to obtain the second map data.

In the implementation, the to-be-updated element refers to the update content in the operation material, such as updating one electronic eye or updating the quantity of road lanes, and each operation material may include one to-be-updated element.

The first target mapsheet data can be edited based on the M to-be-updated elements to obtain updated mapsheet data, and then the updated mapsheet data can be merged with the target data to obtain the second map data, wherein the second map data is the map data updated from the first map data, and the second map data includes the merged mapsheet data and the data of other mapsheets in the first map data than the mapsheet corresponding to the update information.

It is also possible to edit the first target mapsheet data based on some to-be-updated elements in the M to-be-updated elements, to obtain the updated mapsheet data, and then merge the updated mapsheet data with the target data, and perform edit processing on the merged mapsheet data based on other operation materials, to finally obtain the second map data.

The merging the second target mapsheet data and the target data may specifically include: adding the data newly added in the second target mapsheet data into the target data, and at the same time replacing the data corrected by the second target mapsheet data in the target data.

For, example, assuming the target data is D1, the clipped mapsheet data, that is, the first target mapsheet data, is D2, and the edited mapsheet data, that is, the second target mapsheet data, is D3, then the final merged mapsheet data can be D4=(D3−D2)+D1.

In practice, after the map data updating operation, i.e., editing, the edited mapsheet data can be merged with the target data and the merged mapsheet data can be submitted, and finally, the merged mapsheet data and data of other mapsheets can constitute the second map data.

In the implementation, the method includes: performing, based on the M to-be-updated elements, edit processing on the first target mapsheet data to obtain second target mapsheet data; merging the second target mapsheet data and the target data, to obtain second map data. In this way, the update of the first map data can be realized by means of partial mapsheet data operation based on the operation material, which greatly improves the operation effect of map data updating.

Optionally, before performing, based on the M to-be-updated elements, edit processing on the first target mapsheet data to obtain second target mapsheet data, the method further includes:

marking an editable range corresponding to the first target mapsheet data to obtain a first range;

the performing, based on the M to-be-updated elements, edit processing on the first target mapsheet data to obtain second target mapsheet data includes:

performing, in case that the M to-be-updated elements include a first to-be-updated element, edit processing on the first target mapsheet data based on the first to-be-updated element, to obtain the second target mapsheet data, wherein an update location of the first to-be-updated element is within the first range.

In this implementation, the edited data involved in the to-be-updated element may be boundary data in the first target mapsheet data, and the boundary data may be connected to data of other mapsheets than the mapsheet corresponding to the update information, and may also be connected to deleted data in the mapsheet corresponding to the update information. If the boundary data is modified, there may be a mismatch between the edited mapsheet data and other mapsheet data. Therefore, after the clipping processing, the editable range corresponding to the first target mapsheet data can be marked, so that data editing is performed within the marked editable range.

There are many ways for marking, for example, the range can be marked by marking boundary points, and when the data is loaded, based on the markings of boundary points, the range corresponding to the data associated with the boundary points can be set as the non-editable range, while the range corresponding to other data in the first target mapsheet data can be set as the editable range, and the editable range is the first range. For another example, a polygon marker may be used to define an editable range corresponding to the first target mapsheet data, to obtain the first range.

Correspondingly, the user can edit the first target mapsheet data based on the operation material within the first range. In other words, if there is a to-be-updated element whose update location falls within the first range, namely, a first to-be-updated element, then based on the first to-be-updated element, the first target mapsheet data can be directly edited in the first range to obtain the edited mapsheet data, that is, the second target mapsheet data.

For example, the M to-be-updated elements include to-be-updated element 1, to-be-updated element 2, and to-be-updated element 3, and the update locations of to-be-updated element 1 and to-be-updated element 2 are within the first range, then direct modification of the first target mapsheet data can be made based on the to-be-updated element 1 and to-be-updated element 2, while the update location of to-be-updated element 3 involves the boundary area, thus direct modification of the first target mapsheet data based on the to-be-updated element 3 is not allowed.

In the implementation, the method includes: marking an editable range corresponding to the first target mapsheet data to obtain a first range; performing, in case that the M to-be-updated elements include a first to-be-updated element, edit processing on the first target mapsheet data based on the first to-be-updated element, to obtain the second target mapsheet data, wherein an update location of the first to-be-updated element is within the first range. In this way, it is possible to avoid modifying the data within the boundary range in the first target mapsheet data which may otherwise cause a mismatch between the edited mapsheet data and other mapsheet data, thereby improving the accuracy of map data updating.

Optionally, in case that the M to-be-updated elements include a second to-be-updated element, and an update location of the second to-be-updated element is not within the first range, the merging the second target map data and the target data to obtain second map data includes:

merging the second target mapsheet data and the target data to obtain third target mapsheet data;

performing, based on the second to-be-updated element, edit processing on the third target mapsheet data to obtain the second map data.

In this implementation, for the second to-be-updated element whose update location is not within the first range, that is, the update location is within the non-editable range corresponding to the first target mapsheet data, such as, inside the boundary area, the second target mapsheet data and the target data can be merged to obtain the third target mapsheet data.

For example, the M to-be-updated elements include to-be-updated element 1, to-be-updated element 2, and to-be-updated element 3, and the update locations of to-be-updated element 1 and to-be-updated element 2 are within the first range, then the first target mapsheet data can be directly modified based on the to-be-updated element 1 and to-be-updated element 2 to obtain the second target mapsheet data, while the update location of to-be-updated element 3 involves the boundary area.

In this case, the second target mapsheet data can be merged with the target data to obtain the complete data of one mapsheet, that is, the third target mapsheet data. Based on to-be-updated element 3, data modification is performed on the complete data of one mapsheet, so as to avoid modifying the data within the boundary range in the first target mapsheet data which may otherwise cause the mismatch between the edited mapsheet data and other mapsheet data, thereby improving the accuracy of map data updating, and also enabling updating the to-be-updated elements in the boundary area.

Optionally, before merging the second mapsheet data and the target data to obtain the second map data, the method further includes:

checking correctness of the second target mapsheet data, to obtain a check result;

the merging the second target mapsheet data and the target data to obtain the second map data includes:

merging, in case that the check result indicates that the second target mapsheet data is correct, the second target mapsheet data and the target data to obtain the second map data.

In this implementation, after edit processing is performed on the first target mapsheet data based on the M to-be-updated elements, the edited mapsheet data, that is, the second target mapsheet data, may be subjected to quality inspection, which is mainly to check correctness of the second target mapsheet data, that is, determine whether the edited mapsheet data is correct, to obtain the check result. The existing or new quality inspection method may be used to check the data correctness of the second target mapsheet data, which is not specifically limited here.

In case that the check result indicates that the second target mapsheet data is correct, the second target mapsheet data and the target data are merged to obtain the second map data. In case that the check result indicates that the second target mapsheet data is wrong, the process proceeds to manual correction until the mapsheet data is correct.

In this implementation, since the data volume of the second target mapsheet data is greatly reduced compared to the complete data of one mapsheet, the time and cost of data quality inspection can be greatly reduced. In addition, a partial data quality inspection mode may be used to perform quality inspection on the second target mapsheet data, and the partial data quality inspection mode refers to a mode of performing quality inspection on partial data of one mapsheet. Compared to the quality inspection mode for complete data of one mapsheet, the partial data quality inspection mode can dispense with check such as road connectivity check, thereby further reducing the time and cost of data quality inspection.

Further, in case that the M to-be-updated elements include the second to-be-updated element, since it is also necessary to perform edit processing on the third target mapsheet data based on the second to-be-updated element, in order to ensure the correctness of the edited data, it is also necessary to perform quality inspection on the edited third target mapsheet data. The quality inspection mode can be a complete mapsheet quality inspection mode, that is, the quality inspection mode for the complete data of the mapsheet. After passing the quality inspection, the edited third target mapsheet data will be submitted, to finally obtain the second map data.

In order to introduce the solutions of the embodiments of the present disclosure in more detail, a detailed description is given below by taking a partial data operation system as an example.

Figure 6:
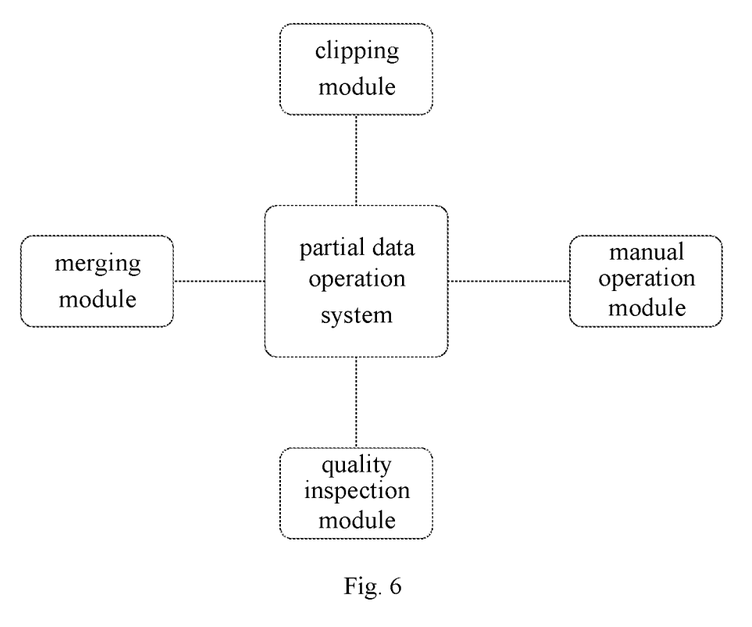
FIG. 6 is a schematic structural diagram of a partial data operation system.

FIG. 6 is a schematic structural diagram of the partial data operation system. As shown in FIG. 6, the partial data operation system includes a clipping module, a manual operation module, a merging module and a quality inspection module.

The clipping module is configured to clip the target data of the mapsheet to obtain the clipped mapsheet data;
the manual operation module is configured to modify the data within the editable range in the clipped mapsheet data, to obtain the edited mapsheet data;
the quality inspection module is configured to perform quality inspection on the edited mapsheet data;
the merging module is configured to merge the edited mapsheet data with the target data.

Updating the map data based on operation material 1 of adding electronic eye and operation material 2 of increasing the quantity of road lanes is taken as an example. The operation task package includes mapsheet 1, mapsheet 2, operation material 1 and operation material 2, and a detail process is shown as follows.

Before the manual operation, the clipping module clips the mapsheet 1 and mapsheet 2 according to the characteristics of the material, and marks the boundary points. Specifically, the mapsheet 1 can be clipped according to the point radiation space, and the target data of the mapsheet 1 can be clipped centered at the electronic eye and with a radius of 500 meters, to obtain the clipped mapsheet data of the mapsheet 1. Mapsheet 2 can be clipped according to the road link space, and the target data of mapsheet 2 can be clipped using the road to which the lane quantity material is bound as a baseline, the left and right margins of the road link being 100 meters, and tracing forward and backward for 1000 meters (a total of 2000 meters) along the road link, to obtain the clipped mapsheet data of the mapsheet 2.

During manual operation, according to the markings of boundary points, elements associated with the boundary points in the clipped mapsheet data of the mapsheet 1 and the clipped mapsheet data of the mapsheet 2 are set as non-editable elements during data loading.

During the operation, if the to-be-updated element is editable, it can be modified directly. If the clipped mapsheet data of the mapsheet 1 is modified based on operation material 1, the to-be-modified data is irrelevant to the boundary and can be directly modified to obtain the edited mapsheet data of the mapsheet 1.

If the to-be-updated element is a non-editable element, the merging module is used to merge the edited mapsheet data with the target data, the merged mapsheet data is reloaded, and then edit is performed on the merged data.

If the clipped mapsheet data of the mapsheet 2 is modified based on operation material 2, because the to-be-modified data extends to the boundary and is not modifiable, the following operation is performed: activate a merging function through the merging module, and submit the data to be merged, that is, the clipped mapsheet data of mapsheet 2; the background service merges the submitted mapsheet data with the target data of mapsheet 2 and returns it; close the mapsheet corresponding to the clipped mapsheet data of the mapsheet 2, and reload the merged mapsheet. After that, data is modified in the reloaded mapsheet based on the operation material 2, to obtain the edited mapsheet data of mapsheet 2.

The quality inspection module performs quality inspection on the edited mapsheet data of the mapsheet 1 and the edited mapsheet data of the mapsheet 2 respectively. For mapsheet 1, the data correctness can be checked in the partial data quality inspection mode, while for mapsheet 2, the data correctness can be checked in the complete mapsheet quality inspection mode.

For mapsheet 1, after the quality inspection module indicates that it passes the data quality inspection, the merging module can be used to merge the edited mapsheet data of the mapsheet 1 with the target data of mapsheet 1 and submit the merged data. For mapsheet 2, after the quality inspection module indicates that it passes the data quality inspection, no merging is performed any more. Finally, the second map data can be obtained.

Second Embodiment

Figure 7:
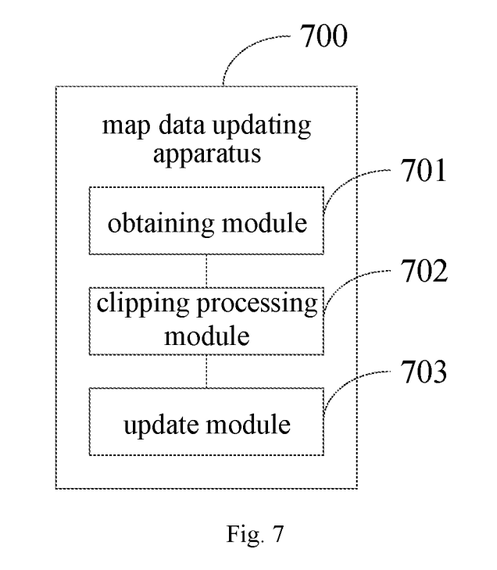
FIG. 7 is a schematic structural diagram of a map data updating apparatus according to a second embodiment of the present disclosure.

As shown in FIG. 7, the present disclosure provides a map data updating apparatus 700, including:
an obtaining module 701, configured to obtain update information of first map data, and a mapsheet in the first map data that corresponds to the update information;
a clipping processing module 702, configured to perform, based on a spatial update range of the update information, clipping processing on target data of the mapsheet to obtain first target mapsheet data, the first target mapsheet data including data in the target data that is within the spatial update range;

an update module 703, configured to update, based on the first target mapsheet data and the update information, the first map data.

Optionally, the update information includes M to-be-updated elements, M being a positive integer, and the update module 703 includes:

an edit processing unit, configured to perform, based on the M to-be-updated elements, edit processing on the first target mapsheet data to obtain second target mapsheet data;

a merge processing unit, configured to merge the second target mapsheet data and the target data to obtain second map data.

Optionally, the apparatus further includes:

a marking module, configured to mark an editable range corresponding to the first target mapsheet data to obtain a first range;

the edit processing unit is specifically configured to perform, in case that the M to-be-updated elements include a first to-be-updated element, edit processing on the first target mapsheet data based on the first to-be-updated element, to obtain the second target mapsheet data, wherein an update location of the first to-be-updated element is within the first range.

Optionally, in case that the M to-be-updated elements include a second to-be-updated element, and an update location of the second to-be-updated element is not within the first range, the merge processing unit is specifically configured to:

merge the second target mapsheet data and the target data to obtain third target mapsheet data;

perform, based on the second to-be-updated element, edit processing on the third target mapsheet data to obtain the second map data.

Optionally, the apparatus further includes:

a check processing module, configured to check correctness of the second target mapsheet data to obtain a check result;

the merge processing unit is specifically configured to merge, in case that the check result indicates that the second target mapsheet data is correct, the second target mapsheet data and the target data to obtain the second map data.

The map data updating apparatus 700 provided in the present disclosure can realize all the processes implemented by the foregoing map data updating method and can achieve the same technical effect. The details will not be repeated here.

According to embodiments of the present disclosure, an electronic device, a readable storage medium and a computer program product are further provided.

Figure 8:
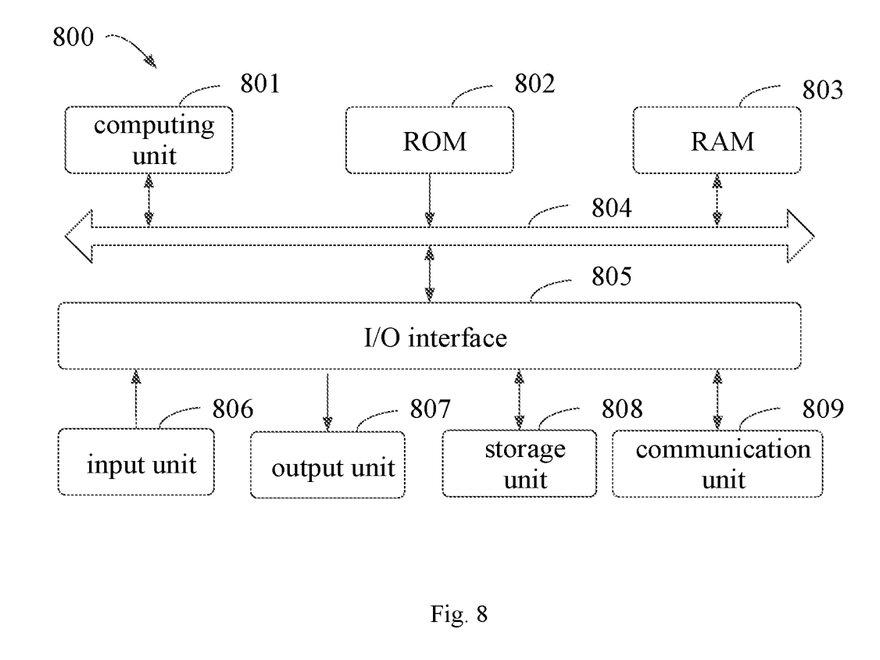
FIG. 8 is a schematic block diagram of an exemplary electronic device for implementing embodiments of the present disclosure.

FIG. 8 is a schematic block diagram of an exemplary electronic device in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 8, the device 800 includes a computing unit 801, which may carry out various suitable actions and processes according to a computer program stored in a read-only memory (ROM) 802 or a computer program loaded from a storage unit 808 into a random access memory (RAM) 803. The RAM 803 may as well store therein all kinds of programs and data required for the operation of the device 800. The computing unit 801, the ROM 802 and the RAM 803 are connected to each other through a bus 804. An input/output (I/O) interface 805 is also connected to the bus 804.

Multiple components in the device 800 are connected to the I/O interface 805. The multiple components include: an input unit 806, e.g., a keyboard, a mouse and the like; an output unit 807, e.g., a variety of displays, loudspeakers, and the like; a storage unit 808, e.g., a magnetic disk, an optic disc and the like; and a communication unit 809, e.g., a network card, a modem, a wireless transceiver, and the like. The communication unit 809 allows the device 800 to exchange information/data with other devices through a computer network and/or other telecommunication networks, such as the Internet.

The computing unit 801 may be any general purpose and/or special purpose processing components having a processing and computing capability. Some examples of the computing unit 801 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 801 carries out the aforementioned methods and processes, e.g., the map data updating method. For example, in some embodiments, the map data updating method may be implemented as a computer software program tangibly embodied in a machine readable medium such as the storage unit 808. In some embodiments, all or a part of the computer program may be loaded and/or installed on the device 800 through the ROM 802 and/or the communication unit 809. When the computer program is loaded into the RAM 803 and executed by the computing unit 801, one or more steps of the foregoing map data updating method may be implemented. Optionally, in other embodiments, the computing unit 801 may be configured in any other suitable manner (e.g., by means of a firmware) to implement the map data updating method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server can be a cloud server, also known as a cloud computing server or a cloud host, and it is a host product in the cloud computing service system to solve the deficiencies of difficult management and weak business scalability that exist in the traditional physical hosts and VPS (Virtual Private Server). The server can also be a server of a distributed system, or a server combined with a blockchain.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the range of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the range of the present disclosure.

What is claimed is:

1. A map data updating method, performed by an electronic device, comprising:
    obtaining update information of first map data, and then obtaining, according to the update information, a mapsheet in the first map data that corresponds to the update information;
    deleting, based on a spatial update range of the update information, at least a portion of target data of the mapsheet to obtain first target mapsheet data, the target data being all data within a spatial range of the mapsheet, the first target mapsheet data comprising data in the target data that is within the spatial update range;
    updating, based on the first target mapsheet data and the update information, the first map data;
    wherein the update information comprises M to-be-updated elements, M being a positive integer, each of the to-be-updated elements comprises a map location that needs to be updated and corresponding update content, and the updating, based on the first target mapsheet data and the update information, the first map data comprises:
    performing, based on the M to-be-updated elements, edit processing on the first target mapsheet data to obtain second target mapsheet data;
    modifying the target data in accordance with a difference of the second target mapsheet data relative to the first target mapsheet data, to obtain second map data;
    wherein, before the performing, based on the M to-be-updated elements, the edit processing on the first target mapsheet data to obtain the second target mapsheet data, the method further comprises:
    marking an editable range corresponding to the first target mapsheet data as a first range, wherein the editable range comprises data in the first target mapsheet data that is other than boundary data of the first target mapsheet data;
    the performing, based on the M to-be-updated elements, the edit processing on the first target mapsheet data to obtain the second target mapsheet data comprises:
    performing, in case that the M to-be-updated elements comprise a first to-be-updated element, edit processing on the first target mapsheet data based on the first to-be-updated element, to obtain the second target mapsheet data, wherein an update location of the first to-be-updated element is within the first range.

2. The map data updating method according to claim 1, wherein, in case that the M to-be-updated elements further comprise a second to-be-updated element, and an update location of the second to-be-updated element is not within the first range, the modifying the target data in accordance with the difference of the second target mapsheet data relative to the first target mapsheet data to obtain the second map data comprises:
modifying the target data in accordance with the difference of the second target mapsheet data relative to the first target mapsheet data, to obtain third target mapsheet data;
performing, based on the second to-be-updated element, edit processing on the third target mapsheet data to obtain the second map data.

3. The map data updating method according to claim 1, wherein, before the modifying the target data in accordance with the difference of the second target mapsheet data relative to the first target mapsheet data to obtain the second map data, the method further comprises:
checking correctness of the second target mapsheet data, to obtain a check result;
the modifying the target data in accordance with the difference of the second target mapsheet data relative to the first target mapsheet data to obtain the second map data comprises:
modifying, in case that the check result indicates that the second target mapsheet data is correct, the target data in accordance with the difference of the second target mapsheet data relative to the first target mapsheet data, to obtain the second map data.

4. An electronic device, comprising:
at least one processor; and
a memory communicatively connected to the at least one processor; wherein, the memory stores therein an instruction configured to be executed by the at least one processor, and the at least one processor is configured to execute the instruction, to implement following steps:
obtaining update information of first map data, and then obtaining, according to the update information, a mapsheet in the first map data that corresponds to the update information;
deleting, based on a spatial update range of the update information, at least a portion of target data of the mapsheet to obtain first target mapsheet data, the target data being all data within a spatial range of the mapsheet, the first target mapsheet data comprising data in the target data that is within the spatial update range;
updating, based on the first target mapsheet data and the update information, the first map data;
wherein the update information comprises M to-be-updated elements, M being a positive integer, each of the to-be-updated elements comprises a map location that needs to be updated and corresponding update content, and the updating, based on the first target mapsheet data and the update information, the first map data comprises:
performing, based on the M to-be-updated elements, edit processing on the first target mapsheet data to obtain second target mapsheet data;
modifying the target data in accordance with a difference of the second target mapsheet data relative to the first target mapsheet data, to obtain second map data;
wherein, before the performing, based on the M to-be-updated elements, the edit processing on the first target mapsheet data to obtain the second target mapsheet data, the at least one processor is configured to execute the instruction to implement:

marking an editable range corresponding to the first target mapsheet data as a first range, wherein the editable range comprises data in the first target mapsheet data that is other than boundary data of the first target mapsheet data;
the performing, based on the M to-be-updated elements, the edit processing on the first target mapsheet data to obtain the second target mapsheet data comprises:
performing, in case that the M to-be-updated elements comprise a first to-be-updated element, edit processing on the first target mapsheet data based on the first to-be-updated element, to obtain the second target mapsheet data, wherein an update location of the first to-be-updated element is within the first range.

5. The electronic device according to claim 4, wherein, in case that the M to-be-updated elements further comprise a second to-be-updated element, and an update location of the second to-be-updated element is not within the first range, the modifying the target data in accordance with the difference of the second target mapsheet data relative to the first target mapsheet data to obtain the second map data comprises:
modifying the target data in accordance with the difference of the second target mapsheet data relative to the first target mapsheet data, to obtain third target mapsheet data;
performing, based on the second to-be-updated element, edit processing on the third target mapsheet data to obtain the second map data.

6. The electronic device according to claim 4, wherein, before the modifying the target data in accordance with the difference of the second target mapsheet data relative to the first target mapsheet data to obtain the second map data, the at least one processor is configured to execute the instruction to implement:
checking correctness of the second target mapsheet data, to obtain a check result;
the modifying the target data in accordance with the difference of the second target mapsheet data relative to the first target mapsheet data to obtain the second map data comprises:
modifying, in case that the check result indicates that the second target mapsheet data is correct, the target data in accordance with the difference of the second target mapsheet data relative to the first target mapsheet data, to obtain the second map data.

7. A non-transitory computer readable storage medium, storing therein a computer instruction, wherein the computer instruction is configured to be executed by a computer, to implement following steps:
obtaining update information of first map data, and then obtaining, according to the update information, a mapsheet in the first map data that corresponds to the update information;
deleting, based on a spatial update range of the update information, at least a portion of target data of the mapsheet to obtain first target mapsheet data, the target data being all data within a spatial range of the mapsheet, the first target mapsheet data comprising data in the target data that is within the spatial update range;
updating, based on the first target mapsheet data and the update information, the first map data;
wherein the update information comprises M to-be-updated elements, M being a positive integer, each of the to-be-updated elements comprises a map location that needs to be updated and corresponding update content, and the updating, based on the first target mapsheet data and the update information, the first map data comprises:

performing, based on the M to-be-updated elements, edit processing on the first target mapsheet data to obtain second target mapsheet data;

modifying the target data in accordance with a difference of the second target mapsheet data relative to the first target mapsheet data, to obtain second map data;

wherein, before the performing, based on the M to-be-updated elements, the edit processing on the first target mapsheet data to obtain the second target mapsheet data, the computer instruction is configured to be executed by the computer to implement:

marking an editable range corresponding to the first target mapsheet data as a first range, wherein the editable range comprises data in the first target mapsheet data that is other than boundary data of the first target mapsheet data;

the performing, based on the M to-be-updated elements, the edit processing on the first target mapsheet data to obtain the second target mapsheet data comprises:

performing, in case that the M to-be-updated elements comprise a first to-be-updated element, edit processing on the first target mapsheet data based on the first to-be-updated element, to obtain the second target mapsheet data, wherein an update location of the first to-be-updated element is within the first range.

8. The non-transitory computer readable storage medium according to claim 7, wherein, in case that the M to-be-updated elements further comprise a second to-be-updated element, and an update location of the second to-be-updated element is not within the first range, the modifying the target data in accordance with the difference of the second target mapsheet data relative to the first target mapsheet data to obtain the second map data comprises:

modifying the target data in accordance with the difference of the second target mapsheet data relative to the first target mapsheet data, to obtain third target mapsheet data;

performing, based on the second to-be-updated element, edit processing on the third target mapsheet data to obtain the second map data.

9. The non-transitory computer readable storage medium according to claim 7, wherein, before the modifying the target data in accordance with the difference of the second target mapsheet data relative to the first target mapsheet data to obtain the second map data, the computer instruction is configured to be executed by the computer to implement:

checking correctness of the second target mapsheet data, to obtain a check result;

the modifying the target data in accordance with the difference of the second target mapsheet data relative to the first target mapsheet data to obtain the second map data comprises:

modifying, in case that the check result indicates that the second target mapsheet data is correct, the target data in accordance with the difference of the second target mapsheet data relative to the first target mapsheet data, to obtain the second map data.

\* \* \* \* \*